United States Patent [19]

Travert

[11] Patent Number: 4,814,862
[45] Date of Patent: Mar. 21, 1989

[54] METHOD FOR SEPARATING THE LUMINANCE AND CHROMINANCE SIGNALS OF A PAL OR SECAM COMPOSITE VIDEO SIGNAL AND A DEVICE FOR THE PRACTICAL APPLICATION OF SAID METHOD

[75] Inventor: Serge Travert, Cesson Sevigne, France

[73] Assignee: Thomson Grand Public, Paris, France

[21] Appl. No.: 140,925

[22] Filed: Dec. 28, 1987

Related U.S. Application Data

[63] Continuation of Ser. No. 871,868, Jun. 9, 1986, abandoned.

[30] Foreign Application Priority Data

Jun. 11, 1985 [FR] France .................. 85 08811

[51] Int. Cl.$^4$ .............................................. H04N 9/78
[52] U.S. Cl. ................................................ 358/31
[58] Field of Search ............................... 358/31

[56] References Cited

U.S. PATENT DOCUMENTS 4,141,035  2/1979  Maxemchuk et al. ............ 358/31

FOREIGN PATENT DOCUMENTS 2054313  2/1981  United Kingdom ........... 358/31
123280   9/1980  Japan ............................... 358/31

*Primary Examiner*—John W. Sheppard
*Attorney, Agent, or Firm*—Oblon, Fisher, Spivak, McClelland & Maier

[57] ABSTRACT

The luminance and chrominance signals of a PAL or SECAM composite video signal are separated by means of a method comprising the following steps:
sampling and digitizing the composite video signal;
determination of a luminance signal and a chrominance signal by means of a first processing channel, from the digital sample of the current point of the image, from a previous sample corresponding to the current point located on the line in the previous field which is spatially positioned in the image immediately beneath the current line, from the luminance signal values already determined in a spatiotemporal neighborhood of the current point and in accordance with an analysis of the local spatiotemporal context of the current point;
determination of a luminance signal and a chrominance signal by means of a second processing channel by applying the digital composite signal to the input respectively of a luminance filter and a chrominance filter;
selection of the luminance and chrominance signals which are present at the output of the first processing channel or of the second processing channel as a function of an analysis of the local spatiotemporal context of the point performed on the basis of the luminance signal determined by the second processing channel and on the basis of the luminance signal values already selected and delayed by a field period.

6 Claims, 3 Drawing Sheets

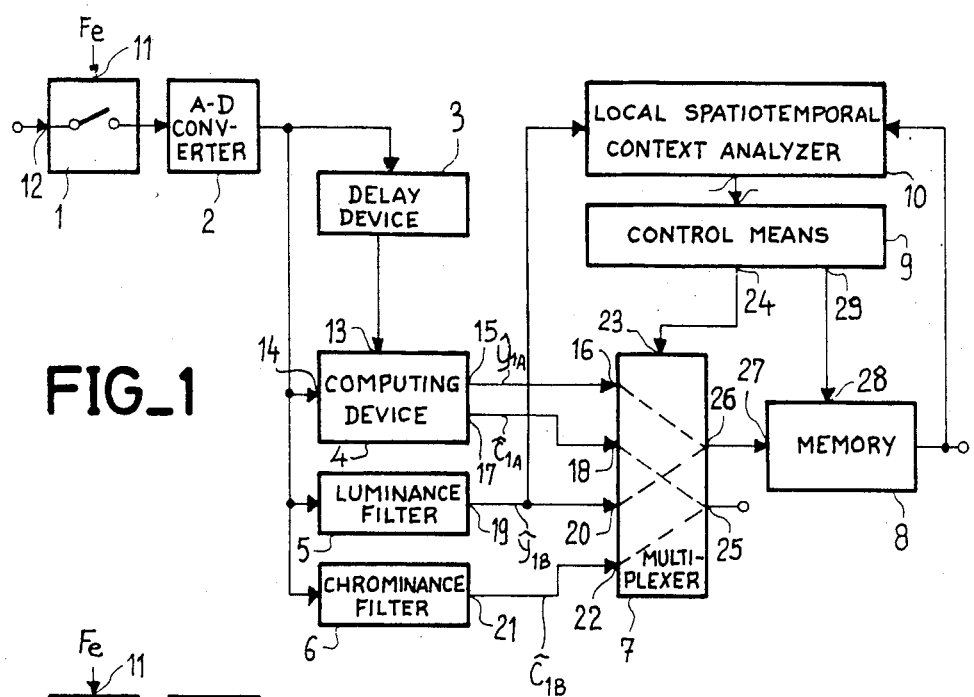
FIG_1
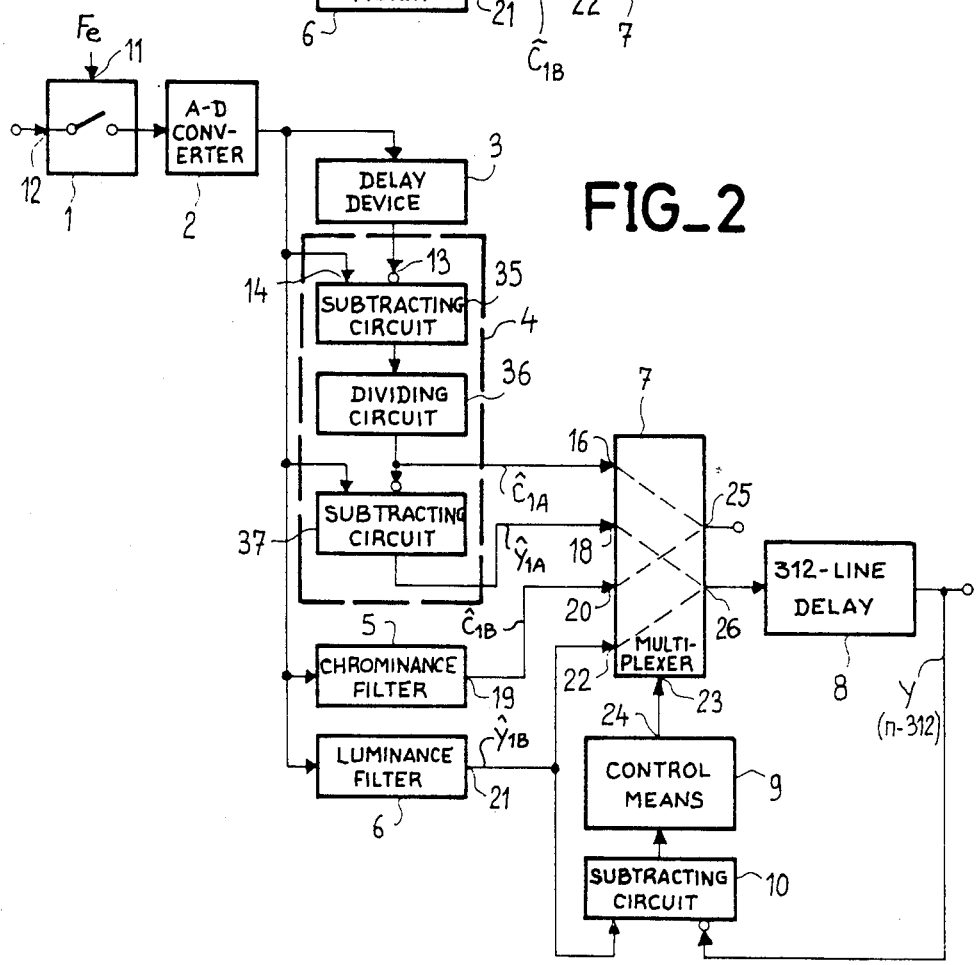
FIG_2

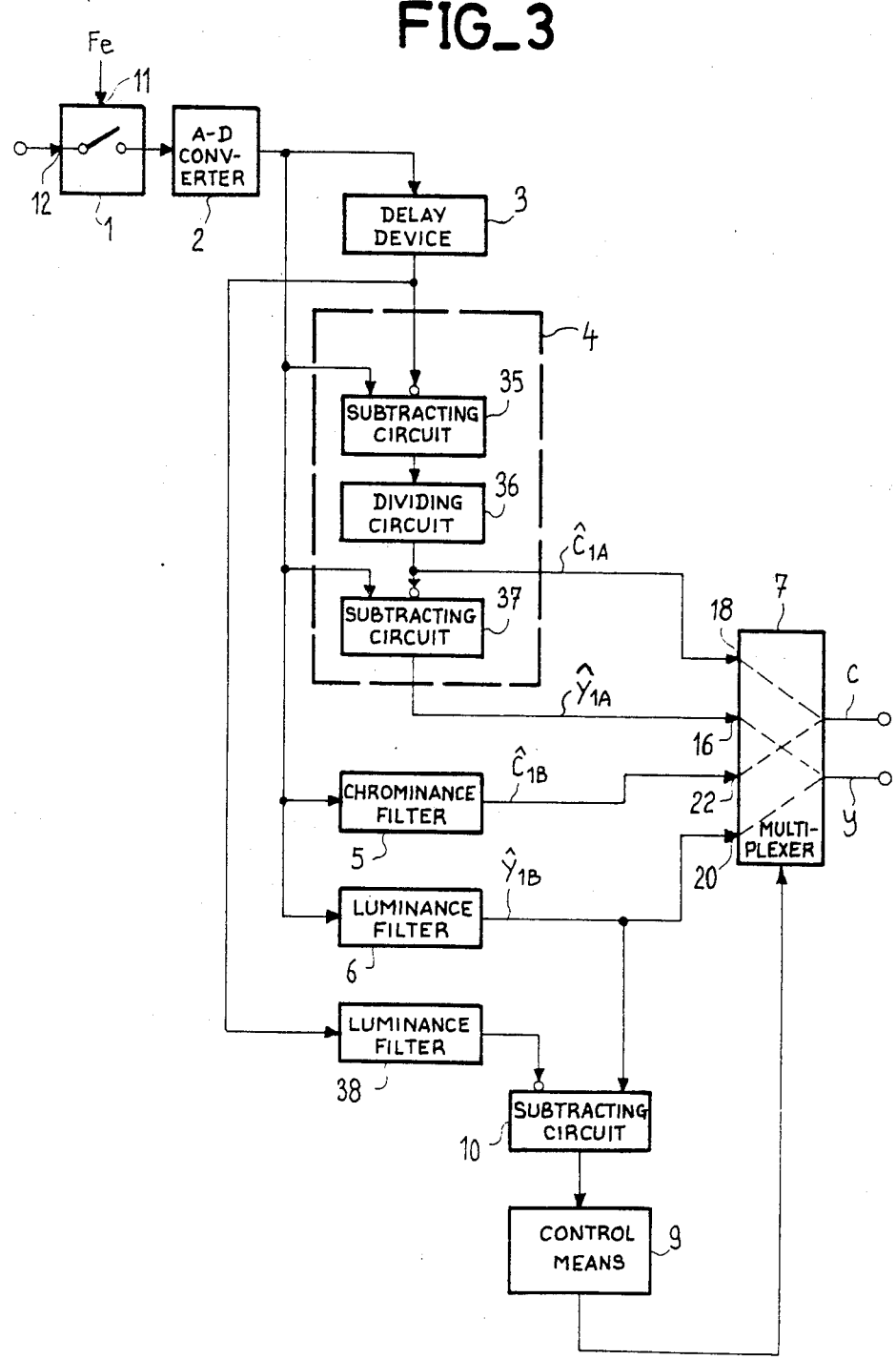
FIG_3

FIG_4
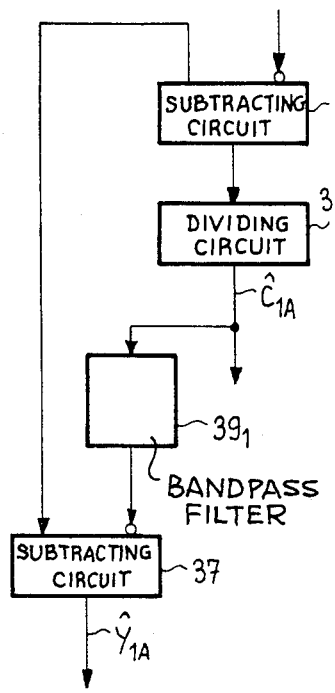
FIG_5
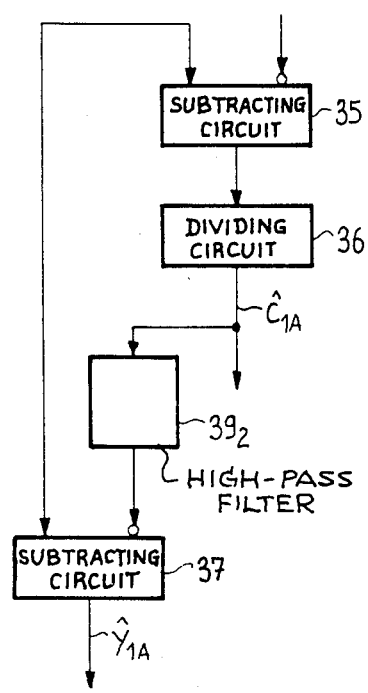
FIG_6
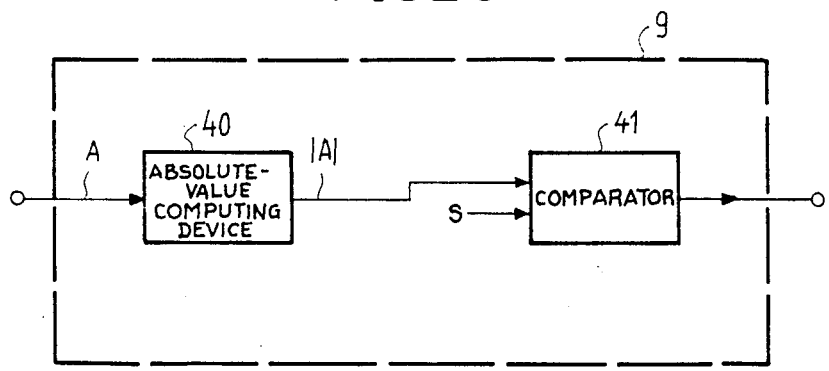

4,814,862

METHOD FOR SEPARATING THE LUMINANCE AND CHROMINANCE SIGNALS OF A PAL OR SECAM COMPOSITE VIDEO SIGNAL AND A DEVICE FOR THE PRACTICAL APPLICATION OF SAID METHOD

This application is a continuation of application Ser. No. 871,868, filed on June 9, 1986, now abandoned.

BACKGROUND OF THE INVENTION

1. Field of the Invention

This invention relates to a method for separating the luminance and chrominance signals of a PAL or SECAM composite video signal and to a device for the practical application of said method. The invention is applicable to television receivers operating on PAL or SECAM standards as well as to any television equipment in which the luminance and chrominance signals are separated by means of a composite video signal.

2. Description of the Prior Art

In all color television systems, provision is made for a separation circuit which makes use of the composite video signal in order to deliver the luminance signal which represents the light intensity at each image point as well as the chrominance signal which represents the color of a point or group of points.

In the SECAM process, this separation is carried out by means of analog filters. The filter which restores the chrominance subcarrier is called a "bell" filter with reference to the shape of its curve of gain as a function of frequency. The filter which delivers the luminance signal is designated as a chrominance subcarrier rejector since it eliminates said subcarrier, the frequency of which is usually 4.286 MHz. This method of separation is attended by a certain number of drawbacks. In the first place, the separation is imperfect and gives rise to chromatic crosstalk phenomena known as "cross-color" and "cross-luminance". In the second place, restoration of the luminance information which is present in the composite video signal is lost at the frequencies which are eliminated by the chrominance subcarrier rejection filter. Finally, like any device of the analog type, this device is subject to problems of adjustment and instability.

In the case of the SECAM system, a circuit has been proposed for separating luminance and chrominance signals in which the conventional analog method outlined in the foregoing is carried out by digital processing means. A circuit of this type is described in French patent application No. 81.08343 filed in the name of Thomson-Brandt and the improvements obtained are limited to those achieved by digital techniques with respect to analog techniques, namely absence of adjustment, stability, insensitivity to noise.

The conventional method employed for separating luminance and chrominance signals in the PAL system is identical with the method employed in the SECAM system. By means of the analog composite video signal, the luminance signal is extracted by attenuating the chrominance signal located in the upper portion of the spectrum of the composite signal whilst the chrominance signal is obtained by means of a bandpass filter for selecting the upper portion of the spectrum of the composite signal. These two filtering operations are carried out by means of analog techniques and the disadvantages observed are those already mentioned in the case of the SECAM system.

In the case of the PAL system, a certain number of alternative techniques have been proposed for separating luminance and chrominance signals. The common principle of these techniques consists in filtering the composite video signal by means of a vertical comb filter of the type described, for example, in European patent Application No. 83.107.430.7 and No. 83.107.431.5 filed in the name of Tokyo Shibaura Denki Kabushiki Kaisha. These techniques turn to useful account the fact that, in the PAL system, the chrominance signals are in phase opposition when a two-line shift is produced in a given frame. It is possible by means of the same techniques to eliminate the cross-color and cross-luminance phenomena mentioned earlier and to restore the high-frequency luminance information in image areas which do not contain vertical transitions. A disadvantage, however, lies in the fact that false colors and transition shifts appear in the vicinity of vertical transitions.

SUMMARY OF THE INVENTION

The present invention proposes a remedy for the above-mentioned cross-color and cross-luminance phenomena and for the loss of high-frequency luminance information in image areas which exhibit neither marked vertical transitions nor medium-speed or high-speed motion transitions while at the same time introducing no additional degradations in the vicinity of marked vertical transitions and either medium-speed or high-speed motion transitions.

To this end, the invention is directed to a method for separating luminance and chrominance signals of a PAL or SECAM composite video signal, said method being distinguished by the fact that it consists:

in sampling and digitizing a PAL or SECAM composite video signal;

in determining a luminance signal and a chrominance signal by means of a first processing channel, from the digital sample of the current point of the image, from a previous sample corresponding to the current point located on the line in the previous field which is spatially positioned in the image immediately beneath the current line, from the luminance signal values already determined in a spatiotemporal neighborhood of the current point and in accordance with an analysis of the local spatiotemporal context of the current point;

in determining a luminance signal and a chrominance signal by means of a second processing channel by applying the digital composite signal to the input respectively of a luminance filter and a chrominance filter;

in selecting the luminance and chrominance signals which are present at the output of the first processing channel or of the second processing channel as a function of an analysis of the local spatiotemporal context of the point performed on the basis of the luminance signal determined by the second processing channel and on the basis of the luminance signal values already determined in a spatiotemporal neighborhood of the point.

The invention is also directed to a device for separating luminance and chrominance signals of a PAL or SECAM composite video signal, said device being distinguished by the fact that it comprises:

means for sampling and digitizing the PAL or SECAM analog composite video signal;

a delay device for delaying by a time interval of approximately one field each digital sample delivered by the sampling and digitizing means;

a first channel for extracting the luminance and chrominance signals from the digital samples delivered by the sampling and digitizing means and from the digital samples delivered by the delay device;

a second channel for extracting luminance and chrominance signals comprising a luminance filter and a chrominance filter for filtering the digital composite video signal delivered by the sampling and digitizing means;

means for analyzing the local spatiotemporal context of each processed current point;

selecting means for delivering at the output of the separating device the signals produced by either of the two channels for extracting luminance and chrominance signals;

control means for producing signals which control the selecting means and the first channel for extracting luminance and chrominance signals from the analysis of the local spatiotemporal context delivered by the analyzing means.

Apart from the fact that the invention provides a remedy for cross-color and cross-luminance phenomena and loss of high-frequency luminance information, the digital techniques employed in the practical application of the invention offer the known advantages of digital techniques over analog techniques. A further advantage of the invention is that it achieves identical separation of the luminance and chrominance signals by means of a PAL or SECAM composite video signal.

The advantages of the invention result from the following considerations.

It will be supposed in a practical example that two television lines are scanned with a temporal displacement having a value of 312 times the duration of one television line, these lines being designated hereinafter as the line n and the line n-312. The line n-312 is located in the field which precedes the field of line n, immediately beneath the line n. It will also be supposed that the references $Y_o$, $C_o$ and $S_o$ designate respectively the luminance, chrominance and composite signals along the line n-312 and that the references $Y_1$, $C_1$ and $S_1$ designate the same signals along the line n. The relationship between these signals is governed by the following relations:

$$S_1 = Y_1 + C_1 \text{ and } S_o = Y_o + C_o.$$

In both the PAL and SECAM systems, when there is no vertical transition or motion transition between the lines n-312 and n, the signals $Y_1$ and $Y_o$ are identical and the signals $C_1$ and $C_o$ are in phase opposition.

$$Y_1 = Y_o \quad C_1 = -C_o$$

Under these conditions, the luminance signals $\hat{Y}_{1A}$ and chrominance signals $\hat{C}_{1A}$ along line n can be estimated from the composite signals $S_1$ and $S_o$ by carrying out the following operations:

$$\hat{C}_{1A} = \tfrac{1}{2}(S_1 - S_o) = \tfrac{1}{2}(C_1 - C_o) + \tfrac{1}{2}(Y_1 - Y_o)$$

and $$\hat{Y}_{1A} = S_1 - \hat{C}_{1A} = \tfrac{1}{2}(Y_1 + Y_o) + \tfrac{1}{2}(C_1 + C_o)$$

However, since this estimation becomes unacceptable whenever $Y_1$ and $C_1$ differ substantially from $Y_o$ and $-C_o$ respectively (which in fact occurs in the presence of a vertical transition or a motion transition between lines n-312 and n), the method and the device in accordance with the invention offer an advantage in that they make it possible to validate the estimations $\hat{C}_{1A}$ and $\hat{Y}_{1A}$ only when the difference in luminance between the lines n-312 and n remains smaller than a predetermined threshold value. In certain cases in which this condition is not satisfied, the method and device in accordance with the invention make it possible to estimate a luminance value $\hat{Y}_{1A}$ at the point being processed on the basis of the luminance values already determined in a spatiotemporal neighborhood of the point and as a function of an analysis of the local spatiotemporal context of the point being processed. This analysis results from a contour detection/estimation and/or a motion detection/estimation when considering, for example, the respective luminance values of the point preceding the current point being processed on the same line and of the points of a preceding interlaced field, said values being located respectively above and beneath the current point on two consecutive lines. The chrominance signal $\hat{C}_{1A}$ at the point being processed is obtained in this case by subtracting the estimated luminance signal from the received composite signal:

$$\hat{C}_{1A} = S_1 - \hat{Y}_{1A}$$

In other instances in which the amplitudes of the luminance and chrominance signals vary to a fairly considerable extent between the lines n-312 and n and in which the analysis of the spatiotemporal context of the point being processed does not make it possible to obtain a satisfactory estimation of the luminance at that point, the luminance signals $\hat{Y}_{1B}$ and chrominance signals $\hat{C}_{1B}$ are estimated by filtering the composite video signal $S_1$ by means of a luminance filter by means of a chrominance filter, these filters being formed by digital techniques.

BRIEF DESCRIPTION OF THE DRAWINGS

Other features of the invention will be more apparent upon consideration of the following description and accompanying drawings, wherein:

FIG. 1 is a diagram of one embodiment of the circuit in accordance with the invention for separating luminance and chrominance signals;

FIG. 2 is a diagram of a simplified embodiment of the separating circuit in accordance with the invention;

FIG. 3 is a diagram of another simplified embodiment of the invention;

FIGS. 4 and 5 illustrate two alternative embodiments of the invention;

FIG. 6 is a more detailed diagram showing part of the embodiments presented in FIGS. 2 and 3.

DESCRIPTION OF THE PREFERRED EMBODIMENTS

The circuit in accordance with the invention for separating luminance and chrominance signals as shown in FIG. 1 comprises a sampling circuit 1, an analog-to-digital converter 2, a delay device 3, a computing device 4, a luminance filter 5, a chrominance filter 6, a multiplexer 7, a memory 8, control means 9 and a local spatiotemporal context analyzer 10.

The sampling circuit 1 has a clock input 11 to which is applied a clock signal having a frequency $F_e$ and an analog input 12 to which is applied the PAL and SECAM composite video signal.

The output of the sampling circuit 1 is connected to one input of the analog-to-digital converter 2.

The delay device 3 is connected to the output of the analog-to-digital converter 2 and delays the signals delivered by the analog-to-digital converter 2 by a time interval corresponding to the scanning period of a 312-line field in the PAL or SECAM standards. The output of the delay device 3 is connected to a first input 13 of the computing device 4, a second input 14 of which is connected to the output of the analog-to-digital converter 2 and a third input of which is connected to the output of the control means 9. The computing device 4 delivers an estimation of the luminance signal $\hat{Y}_{1A}$ at a first output 15 and applies said estimation $\hat{Y}_{1A}$ to a first input 16 of the multiplexer 7 and delivers at a second output 17 an estimation of the chrominance signal $\hat{C}_{1A}$ which is applied to a second input 18 of the multiplexer 7.

The luminance filter 5 is connected to the output of the analog-to-digital converter 2 and delivers at its output 19 an estimation $\hat{Y}_{1B}$ of the luminance signal which is applied to a third output 20 of the multiplexer 7.

In addition, the input of the chrominance filter 6 is connected to the output of the analog-to-digital converter 2. Said filter delivers at an output 21 an estimation of the chrominance signal $\hat{C}_{1B}$ which is applied to a fourth input 22 of the multiplexer 7.

The multiplexer 7 is controlled at a control input 23 by an output 24 of the control means 9 and delivers at an output 25 a chrominance signal C which is collected either at the output 17 of the computing device 4 or at the output 21 of the chrominance filter 6. The multiplexer 7 also delivers at an output 26 a luminance signal Y which is collected either at the output 15 of the computing device 4 or at the output 19 of the luminance filter 5.

The output 26 of the multiplexer 7 is connected to a first addressing input 27 of the memory 8 which is controlled at a control input 28 via an output 29 of the control means 9.

The local spatiotemporal context analyzer 10 has a first input which is connected to the output of the memory 8 and a second input which is connected to the output 19 of the luminance filter 5. Said analyzer delivers at an output 31 a signal representing the state of the spatiotemporal context of each image point being processed and applies the state signal obtained to an input 32 of the control means 9.

One embodiment of the computing device 4 and one embodiment of the spatiotemporal context analyzer 10 and their connections with the other elements of the separating circuit shown in FIG. 1 are illustrated in FIG. 2 in which the elements similar to FIG. 1 are designated by the same references. The computing device 4 which is shown in FIG. 2 within a dashed-outline rectangle comprises a subtracting circuit 35, a scale-of-two dividing circuit 36 and a subtracting circuit 37.

The subtracting circuit 35 is connected via a first input to the output of the delay device 3 and via a second input to the output of the analog-to-digital converter 2. The output of the subtracting circuit 35 is connected on the one hand to the input of the dividing circuit 36 which delivers the chrominance signal $\hat{C}_{1A}$ in order to apply this latter to the input 18 of the multiplexer 7 and, on the other hand, to a first operand input of the subtracting circuit 37. Said subtracting circuit 37 is connected via its second operand input to the output of the analog-to-digital converter 2 and delivers an estimation of the luminance signal $\hat{Y}_{1A}$ at its output in order to apply said signal to the input 16 of the multiplexer 7.

In the references $Y_o$, $C_o$ and $S_o$ considered earlier are used to designate the luminance, chrominance and composite signals along the line n-312 and if the aforementioned references $Y_1$, $C_1$ and $S_1$ designate the same signals along the line n, the subtracting circuit 35 and the scale-of-two dividing circuit 36 perform a calculation of the estimation of the chrominance signal by carrying out the operation $$\hat{C}_{1A} = \tfrac{1}{2}(S_1 - S_o) = \tfrac{1}{2}(C_1 - C_o) + \tfrac{1}{2}(Y_1 - Y_o)$$

and the subtracting circuit 37 performs a computation of the estimation of the luminance signal by carrying out the operation $$\hat{Y}_{1A} = S_1 - \hat{C}_{1A} = \tfrac{1}{2}(Y_1 + Y_o) + \tfrac{1}{2}(C_1 + C_o)$$

As in FIG. 1, the chrominance filter 6 delivers the estimation of the chrominance signal $\hat{C}_{1B}$ at its output 21 in order to apply said signal to the input 22 of the multiplexer 7 and the luminance filter 5 delivers the estimation of the luminance signal $\hat{Y}_{1B}$ at its output 19 in order to apply said signal to the input 20 of the multiplexer 7.

The multiplexer 7 delivers either the signals applied to the inputs 16 and 18 or the signals applied to the inputs 20 and 22 as a function of the state of the control signal which is applied to the selection input 23.

In the example of construction shown in FIG. 2, the memory 8 is formed by a delay line which delays the luminance signal Y delivered by the output 26 of the mulitplexer 7 by an interval equal to the time-duration of a 312-line field in accordance with PAL or SECAM standards. The output of said memory is connected to a first input of the spatiotemporal analyzer 10 which consists of a simple subtracter in this example. The second input of the spatiotemporal analyzer 10 is connected to the output 19 of the luminance filter 5.

The spatiotemporal analyzer 10 provides the difference between the estimation of the luminance signal $\hat{Y}_{1B}$ delivered by the luminance filter 6 and the luminance signal (Y (n-312) obtained at the output of the delay line 8. When this difference is small, the estimations $\hat{C}_{1A}$ and $\hat{Y}_{1A}$ provided by the computing device 4 are validated by the control means 9 and the multiplexer 7. On the other hand, when the difference obtained is substantial, that is to say when the amplitudes of the luminance and chrominance signals vary to a very considerable extent between the lines n-312 and n, the control means 9 and the multiplexer 7 validate the estimations $\hat{C}_{1B}$ and $\hat{Y}_{1B}$ provided by the chrominance and luminance filters 5 and 6.

A third embodiment of the device in accordance with the invention for separating luminance and chrominance signals is illustrated in FIG. 3. This embodiment differs from that of FIG. 2 in the fact that the delay device 8 is dispensed with whereas provision is made in addition for a luminance filter 38 coupled between the first input of the substracting circuit 10 and the output of the delay device 5.

FIGS. 4 and 5 illustrate alternative forms of construction of the computing device 4. In the computing device shown in FIG. 4, a bandpass filter $39_1$ is interposed between the output 1 of the scale-of-two divider 36 and the first input of the subtracting circuit 37.

On the other hand, in the example of FIG. 5, a high-pass filter $39_2$ is interposed between said divider output and said first subtracter input.

Finally, FIG. 6 is a more detailed illustration of the control means 9 shown in FIGS. 2 and 3. In this figure, an absolute-value comprising device 40 receives at its input a binary representation of the algebraic number delivered by the subtracter 10 and provides at its output the corresponding binary representation of the absolute value of said algebraic number. A comparator 41 is connected through a first input to the output of the absolute-value computing device 40 and receives on a second input a binary representation of a threshold value S. The output of the computing device 40 delivers in the direction of the control input of the multiplexer 7 of FIGS. 2 and 3 a control signal resulting from a comparison between the threshold value S and the absolute value of the binary number in order to validate, as mentioned earlier, either the chrominance signals $\hat{C}_{1A}$ and luminance signals $\hat{Y}_{1A}$ or the chrominance signals $\hat{C}_{1B}$ and luminance signals $\hat{Y}_{1B}$.

What is claimed is:

1. A method for separating luminance and chrominance signals of a PAL or SECAM composite video signal, comprising the steps of:
    sampling and digitizing a PAL or SECAM composite video signal;
    determining a first estimation of the chrominance signal and the luminance signal by means of a first processing channel, from the digital sample of the composite signal corresponding to the current point of the image, the first estimation of the chrominance signal being obtained by subtracting the composite video signal of the current point of the image from the composite video signal corresponding to the homologue of the current point in the previous field of the image and dividing by two and the first estimation of the luminance signal being obtained by subtracting the first estimation of the chrominance signal of the composite video signal which has been obtained before from the composite video signal of the current point of the image;
    determining a second estimation of the luminance signal and a chrominance signal by means of a second processing channel by applying the digital composite signal corresponding to the current point of the image to the input respectively of a luminance filter and of a chrominance filter;
    selecting for each current point of the image the estimations of the luminance and chrominance signals which are present at the output of the first processing channel or of the second processing channel as a function of the difference value between the estimation of the luminance signal obtained from the second processing channel and a preceding selected value of the luminance signal corresponding to the homologue of the current point in the preceding field of the image.

2. A device for separating luminance and chrominance signals of a PAL or SECAM composite video signal comprising:
    means for sampling and digitizing the PAL or SECAM analogue composite video signal;
    a delay device for delaying by a time interval of approximately one field each digital sample delivered by the sampling and digitizing means;
    a first channel comprising: first means for extracting chrominance samples from digital samples delivered by the sampling and digitizing means, by subtracting each sample of the composite video signal supplied by the delay device, corresponding to the homologue of the current point in the previous field of the image, from each sample of the composite video signal supplied by the sampling and digitizing means, corresponding to the current point of the image, and dividing by two, and second means for extracting luminance samples from digital samples delivered by the sampling and digitizing means, said second means being coupled to said first means and the sampling and digitizing means for subtracting from each current video composite sample supplied by sampling and digitizing means, the chrominance sample supplied by said first means;
    a second channel coupled at the output of sampling and digitizing means for extracting luminance and chrominance samples, comprising a luminance filter and a chrominance filter for filtering the digital composite video signal delivered by the sampling and digitizing means;
    selecting means for delivering at the output of the separating device the signals produced by either of the two channels for extracting luminance and chrominance signals; delay means connected to the luminance output of the selecting means for delaying the selected luminance signal for a field period;
    control means for producing signals which control the selecting means wherein control of the selecting means is obtained on the one hand from the luminance samples delivered at the output of the selecting means and delayed said field delay and on the other hand from the luminance samples delivered by the second extraction channel.

3. A device according to claim 2, wherein the chrominance signal is filtered by a bandpass filter within the computing device before being subtracted from the signal which is present at the input of the delay device.

4. A device according to claim 2, wherein the chrominance signal is filtered by a high-pass filter before being subtracted from the signal which is present at the input of the delay device.

5. A device according to claim 4, wherein control of the selecting means is obtained by computing the absolute value of the number from said subtracting means and by comparing said absolute value with a threshold value (S).

6. A device according to claim 2 wherein control of said selecting means comprise subtracting means coupled to said luminance filter of said second channel and to memory means for extracting chrominance and luminance samples from the first channel when the sample supplied by the luminance filter of said second channel and by the memory means have substantially the same value and for extracting chrominance and luminance samples from the second channel when said second channel and said memory means have substantially a different value.

* * * * *